United States Patent [19]

Hucker et al.

[11] 4,063,144
[45] Dec. 13, 1977

[54] INVERTER FOR PROVIDING A SINUSODIAL OUTPUT HAVING A LOW HARMONIC CONTENT

[75] Inventors: David J. Hucker, Rockford, Ill.; Norbert L. Schmitz, Middleton, Wis.

[73] Assignee: Sundstrand Corporation, Rockford, Ill.

[21] Appl. No.: 670,539

[22] Filed: Mar. 25, 1976

[51] Int. Cl.² ............................................. H02M 1/12
[52] U.S. Cl. ................................................. 363/43 A
[58] Field of Search ................ 321/9 R, 9 A, 27 MS

[56] References Cited

U.S. PATENT DOCUMENTS

| 3,638,094 | 1/1972 | VeNard | 321/5 |
| 3,657,633 | 4/1972 | Urish | 321/9 A |
| 3,767,996 | 10/1973 | Bates | 321/9 A |
| 3,979,662 | 9/1976 | Klein | 321/9 A X |

Primary Examiner—William M. Shoop

Attorney, Agent, or Firm—Wegner, Stellman, McCord, Wiles & Wood

[57] ABSTRACT

A DC to AC inverter in which a composite waveform synthesizing a sinusoidal waveform and having three incremental steps for each quarter cycle is formed by summing an alternating stepped waveform having three steps for half cycle, with a square wave in phase therewith and having a frequency three times greater than the alternating stepped waveform. In a three-phase embodiment of the inverter, each of three stages has a coil that is appropriately switched to opposite polarity terminals of a DC voltage source to form beginning and end segments of the alternating waveform, and a single square wave for all three phases is developed by three series-connected windings respectively inductively coupled with the three coils. The single square wave is added to all three alternating stepped waveforms to form the three composite output waveforms of the inverter.

18 Claims, 8 Drawing Figures

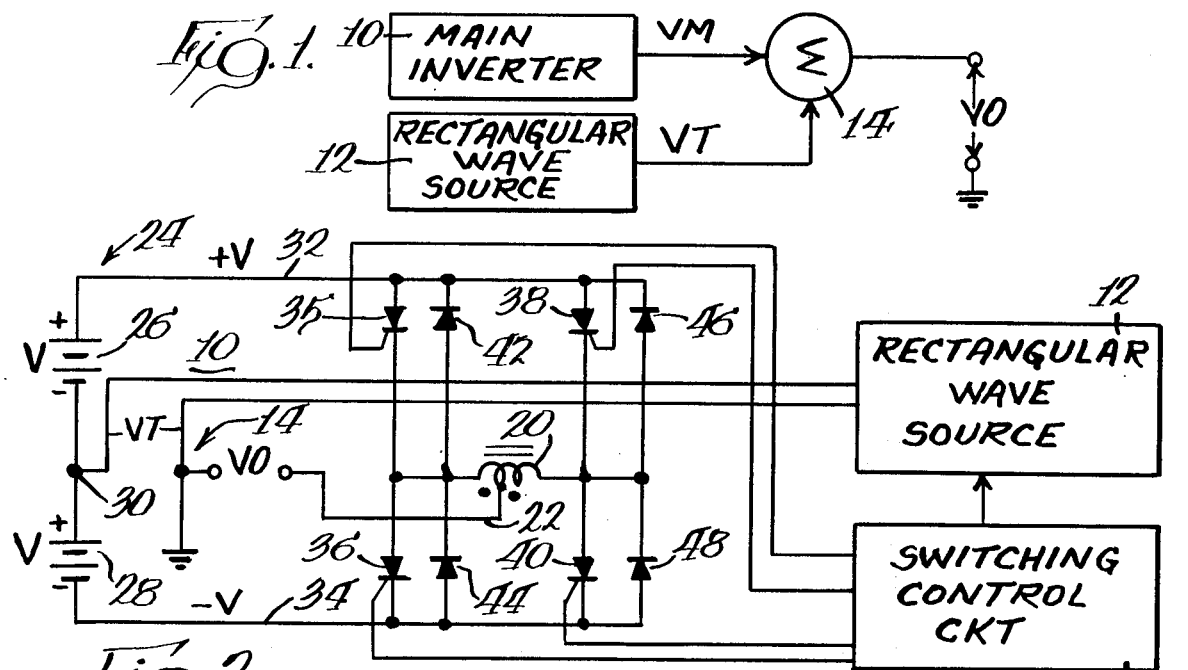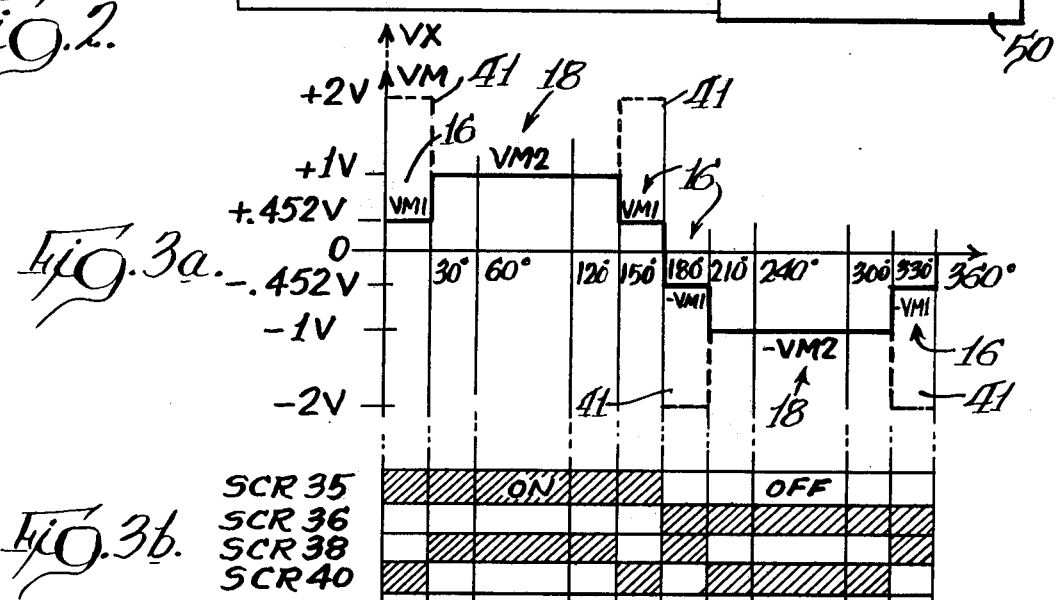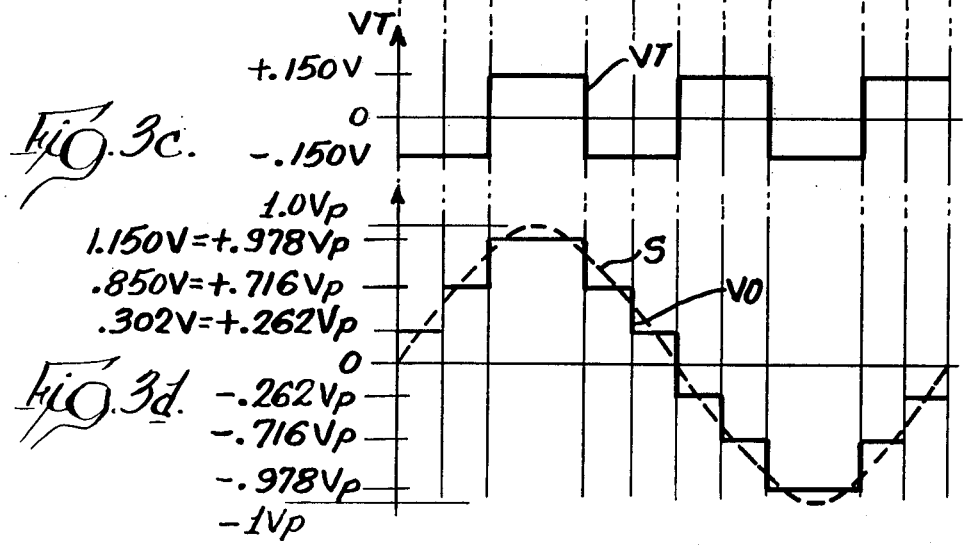

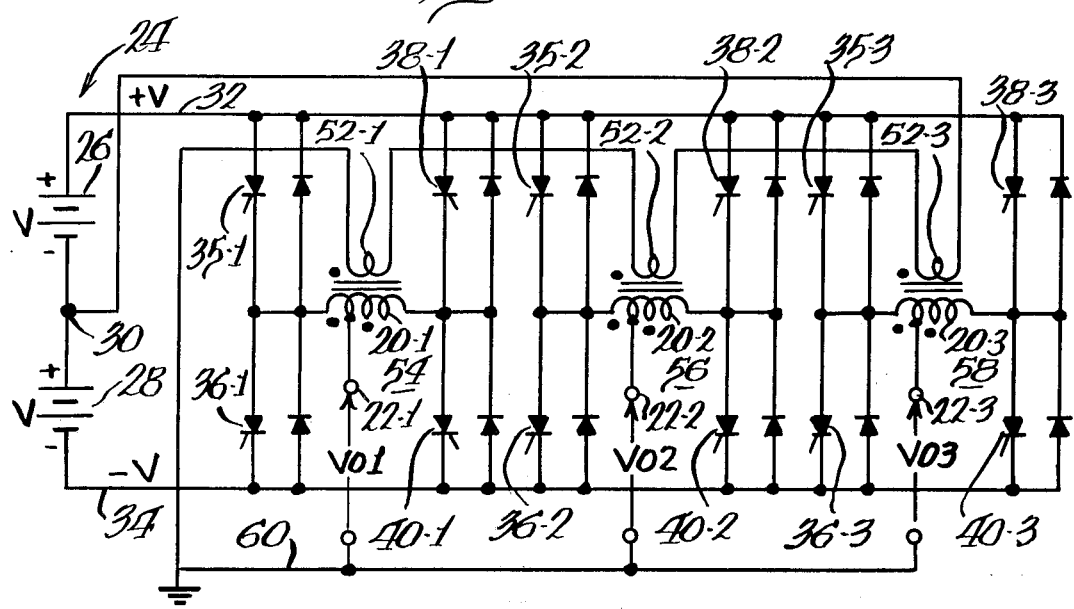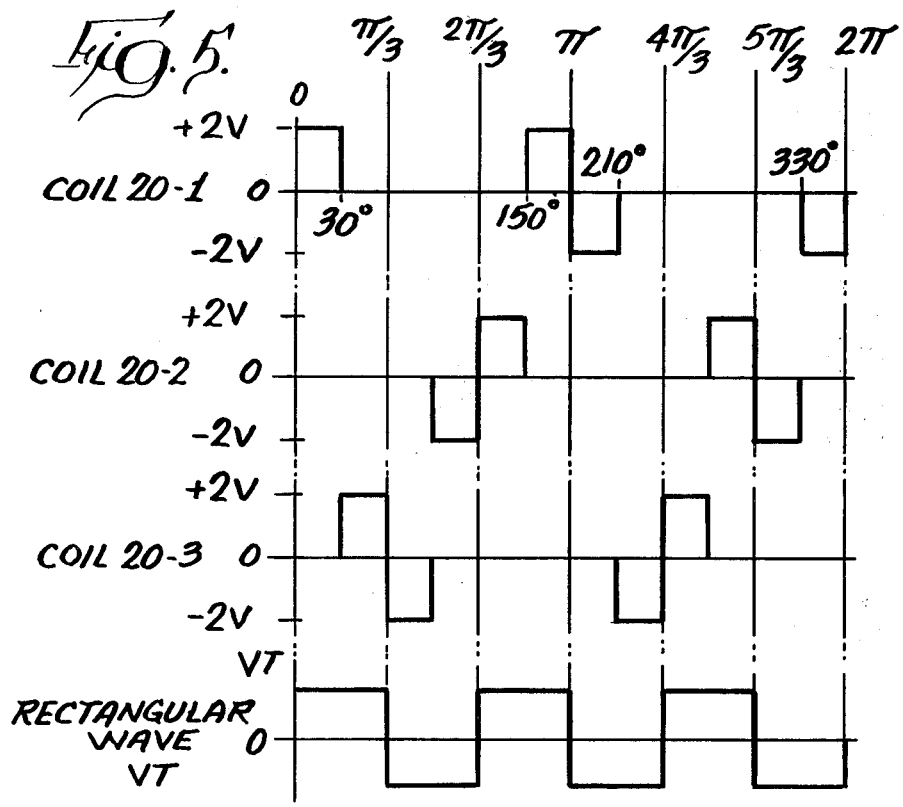

4,063,144

INVERTER FOR PROVIDING A SINUSODIAL OUTPUT HAVING A LOW HARMONIC CONTENT

BACKGROUND OF THE INVENTION

This invention relates to a DC to AC inverter and, more particularly, to such an inverter in which a multiple step approximation to a sinusoidal wave is developed by summing in phase rectangular waves of different frequency.

Inverters are used in a wide variety of applications where only DC power is available, but AC power is needed. Inverters are also used in situations where AC power is available, such as aboard an aircraft, but is unregulated with respect to frequency. In such situations, the available AC power from generators or the like is converted to DC power, regulated with respect to amplitude, and then reconverted to AC power by an inverter which establishes a fixed frequency therefor. In most of these applications it is desired to minimize the number of harmonics in the AC output signal, and in airplane application, in particular, it is most important that the weight of electromagnetic components of the inverter be minimized.

Known DC to AC inverters have used a variety of techniques to synthesize a sinusoidal voltage waveform. In U.S. Pat. No. 3,781,635 of Sauer, a three-phase inverter is shown in which each of the three stages has a voltage divider coil that is appropriately switched to negative and positive sources of voltage to produce a stepped waveform with three steps in each half wave. Because of the phase displacement between the three output waveforms, three phase-to-phase output waveforms approximating sine waves are produced, each of which has three incremental steps in each quarter cycle.

Another three-phase inverter is shown in U.S. Pat. No. 3,573,602 of Jensen in which each composite output wave is formed by adding to a basic impulse occupying substantially the entire amplitude-time area of each half cycle, a pair of symmetrically disposed impulses of substantially less amplitude than the main impulse. The pair of symmetrically disposed impulses are intended to eliminate harmonics, and each is produced by a pair of windings connected in series between an output terminal and a center tap of a choke of the stage associated therewith which are inductively coupled with the chokes of the two other stages, respectively.

In U.S. Pat. No. 3,638,094 of Ve Nard, II, a three-phase inverter is disclosed in which a composite waveform, shown in FIG. 7C, is developed by adding a basic impulse similar to that of Jensen to a stepped waveform similar to that of Sauer and having the same frequency as the basic impulse.

SUMMARY OF THE INVENTION

The principal object of the present invention is to provide an inverter circuit which will produce a sinusoidal output inverter of minimal harmonic content and which has a relatively simple construction and is lightweight.

Another object is to provide such an inverter which will develop three phase-to-neutral sinusoidal voltage waveforms.

A further object of the present invention is to provide an inverter which produces a stepped waveform approximating a sine wave by summing a rectangular waveform of one frequency with a stepped waveform of another frequency less than said one frequency.

Yet another object is the provision of a three-phase inverter in which each of three stages thereof separately develops a stepped waveform, and a single rectangular waveform is added to all three stepped waveforms to respectively develop three composite waveforms synthesizing sine waves.

Still a further objective is to provide such a three-phase inverter wherein a coil in each of the three stages is switched across a DC power source at beginning and end segments of the stepped waveform and the rectangular waveform is produced by summing pulses which are induced in windings inductively coupled with the coils during these segments.

The foregoing objectives will be made more apparent and several features and advantages of the inverter of the present invention will be disclosed in the following description of the preferred embodiment.

BRIEF DESCRIPTION OF THE DRAWING

The detailed description of inverters constructed in accordance with the principles of the present invention will be given with reference to the several Figure of the drawing in which:

FIG. 1 is a simplified block diagram of the inverter;

FIG. 2 is a schematic, partially in block diagram form, of a single phase inverter constructed in accordance with the present invention;

FIG. 3a is an illustration of two waveforms developed in the main inverter schematically illustrated in FIG. 2;

FIG. 3b is an illustration of the switching sequence of the inverter switches of FIG. 2 for development of the waveform of FIG. 3a;

FIG. 3c is a schematic illustration of the waveform produced by the rectangular wave source of FIGS. 1 and 2;

FIG. 3d is a schematic illustration of the composite waveform and the sinusoidal waveform which it approximates that is achieved by summing the stepped waveform of FIG. 3a with the rectangular wave of FIG. 3c;

FIG. 4 is a schematic of a three-phase inverter constructed in accordance with the principles of this invention; and FIG. 5 is a schematic illustration of the pulses developed across the various coils of the inverter of FIG. 4 and a rectangular wave which is obtained by summing these pulses.

DESCRIPTION OF THE PREFERRED EMBODIMENT

Referring to FIG. 1, one embodiment of the DC to AC inverter circuit of this invention is seen to include a main inverter 10, a rectangular waveform source 12 and a summing circuit 14. Referring also to FIG. 3a, the main inverter 10 produces a stepped waveform VM with alternating positive and negative half cycles with respect to a neutral or ground reference potential. The magnitude of stepped waveform VM varies incrementally during each half cycle, having a first value VM1 at beginning and end segments 16 of each half cycle and a second value VM2 greater than the first value VM1 during a segment 18 of each half cycle intermediate the beginning and end segments 16. Referring to FIG. 3c, a rectangular waveform source 12 produces a rectangular wave VT in phase with the stepped waveform VM and having a frequency three times greater than that of the alternating waveform VM. The rectangular waveform VT also alternates above and below ground reference potential and is added to the alternating waveform VM by summation circuit 14 to form a composite waveform VO, schematically illustrated in FIG. 3d. The composite waveform VO comprises an approximation of a sinusoidal waveform S shown in broken line in FIG. 3d with three incremental steps for each quarter cycle.

The harmonic content of the composite output signal VO can be controlled through selection of the magnitude VM1 of the beginning and end segments 16 of the alternating waveform VM relative to the magnitude VM2 of the intermediate segment 18 and also by selecting the duration of the beginning and end segments. In the illustrative waveform of FIG. 3a, the duration of the beginning and end segments 16 is 30° and the magnitude of VM1 is approximately 0.452 VM2 which is a value that substantially eliminates the 5th and 7th harmonics in the output voltage VO. The rectangular waveform VT likewise affects the harmonic content of the output voltage VO. If the rectangular waveform VT is a square wave with a peak magnitude approximately equal to 0.150 of VM2 as illustrated in FIG. 3c, the third harmonic and its multiples are cancelled. All of the odd harmonics up to the 11th are thus eliminated in the composite output waveform VO. The 11th harmonic is relatively small and, accordingly, easily filtered.

One particular form of the main inverter 10 and the summation circuit 14 is shown in FIG. 2. It should, however, be appreciated that other techniques for developing the alternating waveform VM may be employed while still obtaining the benefits derived from synthesizing the composite output waveform VO in the manner described. As seen in FIG. 2, the main inverter 10 includes a coil 20 with an intermediate tap 22 offset from center and a center tapped or tripolar voltage source 24 schematically illustrated by two DC batteries 26 and 28 connected in series with a junction or center tap 30 therebetween connected to ground through rectangular wave source 12. Battery 26 provides a DC voltage +V at a voltage line 32 positive with respect to ground, and battery 28 provides a negative voltage −V on a negative voltage line 34 negative with respect to ground. The composite output waveform VO is developed between ground and intermediate tap 22.

The alternating waveform VM is developed by selectively switching the opposite ends of coil 20 to the positive and negative voltage lines 32 and 34. The end of coil 20 closest to intermediate tap 22 is switched to the positive voltage line 32 through control of a silicon-controlled rectifier (SCR) 35 and switched to the negative voltage line 34 through control of an SCR 36. The other end of coil 20 is switched to the positive voltage line 32 through control of an SCR 38 and to the negative voltage line 34 through control of an SCR 40. Four diodes, 42, 44, 46 and 48, respectively connected in parallel with SCR's 35, 36, 38, 40 provide paths for regenerative current back to the DC power supplies, batteries 26 and 28, and may also be employed to conduct commutating pulses across the SCR's associated therewith.

A conventional switching control circuit 50 is connected to the gates of each of the SCR's 35, 36, 38, 40 and applied trigger and commutating pulses thereto to turn the SCR's on and off in the sequence illustrated in FIG. 3b. As can be seen, during the positive half cycle, SCR 35 is conducting and SCR 36 is nonconducting to apply the positive battery voltage +V to the left side of coil 20, and during negative half cycles, SCR 35 is nonconducting and SCR 36 is conducting to apply the negative battery voltage −V to the left side of coil 20. The right side of coil 20 is selectively switched to the positive and negative battery voltage line during each half cycle to obtain the different output voltages during the different segments thereof. During the beginning and end segments, the appropriate one of SCR's 38 and 40 is turned on to connect the right side of the coil to the voltage line of polarity opposite to that which is connected to the left side of the coil so that the magnitude of voltage applied across the coil is equal to +2V, the sum of the two battery voltages. The voltage signal applied across the coil during the end segments is illustrated by pulses 41 shown in broken line in FIG. 3a. During the intermediate segments 18, SCR's 38 and 40 are selectively switched on to connect the right side of coil 20 to the same voltage line as the left side of the coil so that a zero voltage is applied across coil 20. The voltage at tap 22 relative to ground during the intermediate segments 18 is therefore equal to the magnitude V of the batteries 26 and 28.

For a single phase inverter, the rectangular waveform source 12 may take the form of any number of well-known conventional rectangular wave generators. Maintenance of the proper phase and frequency relationships between the rectangular waveform VT and the alternating waveform VM may be easily achieved by employing a common source of clock signals for both the rectangular wave source and the switching control circuit 50. Summation of the rectangular wave VT with the stepped alternating waveform VM is achieved by applying it between the battery junction 30 and the grounded output terminal.

Referring to FIG. 4, a three-phase embodiment of the inverter is shown wherein three composite output signals VO1, VO2 and VO3, are produced, identical to the composite output waveform VO illustrated in FIG. 3d but which are phase displaced with respect to one another by 120°. The three composite output signals VO1–VO3 are respectively developed by three inverter stages, 54, 56 and 58. Each of these stages is identical to, and functions in the same manner as, the single phase inverter 10 illustrated in FIG. 2.

Accordingly, the circuit elements of each phase have been given the same reference numeral as the corresponding element of the inverter 10 followed by the suffix −1, −2 and −3, respectively designating the stage association with the first, second and third phases. All phases are powered by batteries 26 and 28 and are connected in parallel between the positive voltage line 32 and the negative voltage line 34. The gates of the SCR's of each phase are connected to a conventional switching control circuit (connection not shown) which causes the SCR's of each phase to turn on and turn off in the exact same sequence as SCR's 35, 36, 38, 40 illustrated in FIG. 3b.

Unlike the single phase inverter shown in FIG. 2 which requires a separate rectangular wave source 12, the three-phase inverter of FIG. 4 develops an appropriate rectangular wave VT by summing together the voltage pulses developed across the coils 20-1 through 20-3 during the beginning and end segments 16 of the output waveforms thereof. The voltages applied across coils 20-1, 20-2 and 20-3 and the relative phase relationships between these pulses is illustrated in the top three waveforms of FIG. 5. These pulses applied across coils 20-1 through 20-3 respectively induce voltage pulses of proportional magnitude in the coils 52-1 through 52-3 inductively coupled therewith. The coils 52-1 through 52-3 are connected in series with one another between the center tap 30 and a neutral output terminal 60 common to all three phases which is connected to ground reference potential. This series connection causes the voltage pulses induced in windings 52-1 through 52-3 to be summed together to form the rectangular waveform VT, which in this instance, as seen in the last waveform of FIG. 5, is a square wave at three times the frequency of the three individual pulses from which it is made. The series connection of coils 52-1, 52-2 and 52-3 and their inductive coupling to coils 20-1, 20-2 and 20-3, respectively, sum the rectangular wave VT with each of the stepped waveforms from the inverters 54, 56 and 58 to form the three composite output waveforms VO1, VO2 and VO3.

We claim:

1. An inverter comprising:
   means for generating an alternating stepped waveform having a magnitude which varies incrementally during each half cycle, said magnitude having a first value at the beginning and end segments of each half cycle thereof and a second value greater than said first value during a segment intermediate said beginning and end segments;
   means for generating a rectangular wave, having a constant magnitude during each half cycle, in fixed phase relationship with and having a harmonic frequency greater than that of said alternating stepped waveform, the duration of the rectangular wave being shorter than the duration of the second value of the alternating stepped waveform during each half cycle of the alternating stepped waveform; and
   means for summing said alternating stepped waveform and said rectangular wave to form a composite waveform approximating a sinusoidal waveform, said composite waveform having three steps in each quarter cycle thereof.

2. The inverter of claim 1 wherein said generating means comprises a source of DC voltage providing both positive and negative voltages with respect to a neutral reference potential, a coil with an intermediate tap offset from center, and means for selectively switching said positive and negative voltages to opposite sides of said coil to generate the alternating stepped waveform at said intermediate tap, said composite waveform being developed between said intermediate tap and the neutral reference potential.

3. The inverter of claim 2 wherein said summing means includes a winding inductively coupled with the coil and means for providing a rectangular voltage waveform thereacross.

4. The inverter of claim 2 in which said switching means includes a first switch connected to one side of the coil for applying the positive voltage thereto, a second switch connected with the one side of the coil for coupling the negative voltage thereto, a third switch connected with an opposite side of the coil for coupling it to the positive voltage, and a fourth switch connected to the opposite side of the coil for coupling it with the negative voltage, and means for controlling the switches, said switch controlling means causing the first and fourth switches to assume a conductive state during the beginning and end segments, and the first and third switches to assume conductive states, during the intermediate segments, of positive half waves, and causing the second and third switches to assume conductive states during the beginning and end segments, and the second and fourth switches to assume conductive states, during the intermediate segments, of negative half waves.

5. The inverter of claim 1 in which said rectangular wave has alternating positive and negative portions with respect to a neutral reference potential, each of said portions having a duration less than that of the intermediate segment of the first waveform.

6. The inverter of claim 1 in which said rectangular wave has a frequency three times that of the alternating stepped wave.

7. The inverter of claim 1 in which said rectangular wave is a square wave.

8. The inverter of claim 7 in which said square wave has a frequency three times that of the composite waveform.

9. The inverter of claim 1 including
   means for generating second and third alternating stepped waveforms substantially identical to the first-mentioned alternating stepped waveform and out of phase therewith by 120° and 240°, respectively, and in which
   said summing means includes means for summing said rectangular wave with both the second and third alternating waveforms to form second and third composite waveforms each substantially identical to said first-mentioned composite waveform but out of phase therewith by 120° and 240°, respectively, providing a three-phase output.

10. The inverter of claim 9 in which
    each of said alternating stepped waveform generating means includes
    a coil, and
    means for switching a source of DC voltage across the coil during the beginning and end segments of each half cycle of the alternating waveform thereof, and
    said developing means includes
    means inductively coupled with each of the coils for developing pulses at the beginning and end segments of each of the first, second and third alternating waveforms, and
    means for adding all of said pulses together to form said rectangular wave.

11. The inverter of claim 10 in which each of said coils has a tap at which the one alternating waveform associated therewith is provided.

12. The inverter of claim 8 in which said first, second and third composite waveforms are developed between an output terminal unique to each of the waveform generating means and another terminal common to all the waveform generating means, said source of DC voltage has a neutral terminal at which a neutral reference potential is provided, a positive terminal at which a voltage positive with respect to the neutral reference voltage is provided and a negative terminal at which a voltage negative with respect to the neutral reference voltage is provided, and said inductively coupled means includes a circuit including three windings connected in series with one another between the neutral terminal and the common terminal which are inductively coupled with the coils of the first, second and third alternating waveform generating means, respectively.

13. The inverter of claim 12 in which the unique output terminal of each waveform generating means is connected with an intermediate tap of the coil thereof, and each waveform generating means further includes a first electronic switch connected between one end of the coil and the positive terminal, a second electronic switch connected between the one end of the coil and the negative terminal, a third electronic switch connected with another end of the coil opposite the one end and the positive terminal and a fourth switch connected between the other end of the coil and the negative terminal, and means for controlling the switches, said switch controlling means during each positive half wave causing the first and fourth electronic switches to assume conductive states during the beginning and end segments thereof and causing the first and third electronic switches to assume conductive states during the intermediate segment thereof, and during each negative half wave causing the second and third electronic switches to assume conductive states during the beginning and end segments thereof, and causing the second and fourth electronic switches to assume conductive states during the intermediate segment thereof.

14. The inverter of claim 12 wherein said rectangular wave is a square wave with a frequency three times greater than that of the alternating stepped waveforms and the three steps in each quarter cycle of each of the three composite waveforms have relative magnitudes in the ratio of 262:716:978, and the beginning and end segments of each of the alternating stepped waveforms have a duration of 30°.

15. The inverter of claim 1 in which said alternating stepped waveform, rectangular wave and said composite waveform vary above and below a reference potential during alternating half cycles.

16. The inverter of claim 1 in which each of said beginning and end segments of the alternating stepped waveform has a duration of 30°.

17. The inverter of claim 16 wherein said rectangular wave is a square wave with a frequency three times that of the alternating stepped waveform and the three steps of the composite output waveform have relative magnitudes in the ratio of 262:716:978.

18. A three-phase inverter comprising:
means for generating first, second and third alternating stepped waveforms phase displaced with respect to each other by 120° and each having a magnitude that varies incrementally during each half cycle, the magnitude of each waveform having a first value at the beginning and end segments of each half cycle thereof and a second value greater than said first value during the segment intermediate said beginning and end segments;
means for developing a rectangular wave in fixed phase relationship with, and having a harmonic frequency greater than that of, each of said first, second and third waveforms; and
means for summing said rectangular wave with each of said first, second and third waveforms to form three composite waveforms, each of said composite waveforms approximating a sinusoidal waveform and having three incremental steps of different magnitude in each quarter cycle thereof.

* * * * *